US00RE38818E

(19) United States
(12) Reissued Patent
Amstutz

(10) Patent Number: US RE38,818 E
(45) Date of Reissued Patent: Oct. 11, 2005

(54) SPRING COMPRESSOR

(76) Inventor: Peter Amstutz, R.R. #1, North Lancaster, Ontario (CA)

(21) Appl. No.: 09/981,435

(22) Filed: Oct. 16, 2001

Related U.S. Patent Documents

Reissue of:
(64) Patent No.: 5,967,493
Issued: Oct. 19, 1999
Appl. No.: 08/950,132
Filed: Oct. 14, 1997

(51) Int. Cl.[7] ..... B23P 19/04
(52) U.S. Cl. ..... 254/10.5; 29/227
(58) Field of Search ..... 254/10.5; 29/227, 29/215, 216, 217, 218, 225, 226, 251, 252

(56) References Cited

U.S. PATENT DOCUMENTS 4,009,867 A * 3/1977 Diffenderfer
4,395,020 A * 7/1983 Spainhour
4,516,303 A * 5/1985 Kloster ..... 254/10.5
4,872,644 A * 10/1989 Papapetros ..... 254/10.5
5,031,294 A * 7/1991 Krueger ..... 29/227
5,507,470 A * 4/1996 Amstutz ..... 29/227
6,129,339 A * 10/2000 Lundgreen ..... 254/10.5

FOREIGN PATENT DOCUMENTS

DE 2813381 * 10/1979 ..... 254/10.5
EP 0299880 * 1/1989 ..... 29/227

* cited by examiner

*Primary Examiner*—Joseph J. Hail, III
*Assistant Examiner*—Daniel Shanley

(57) ABSTRACT

A spring compressor of the type having a base, a post, upper spring mounting members fixedly mounted on the upper portion of the post, lower spring mounting members slidably mounted on the lower portion of the post, and a moving device for moving the lower spring mounting members toward the upper spring mounting members to compress a spring mounted between the spring mounting members. The upper spring mounting members have spring engaging elements, preferably in the form of angle irons, for engaging the top of the spring assembly. The spring engaging elements can include retaining bolts for preventing movement of the spring assembly toward or away from the post. The spring compressor can also have adapters mounted on at least one of the upper and lower spring mounting members to engage portions of the side of a coil of the spring.

26 Claims, 6 Drawing Sheets

SPRING COMPRESSOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention is directed toward an improved spring compressor of the type shown in U.S. Pat. No. 5,507,470. The invention is also directed toward a dolly for use with the improved spring compressor to move the compressor.

2. Description of the Related Art Including Information Disclosed Under CFR §§ 1.97–1.99

Spring compressors of this type employ a top spring mounting means fixed on a vertical post and a bottom spring mounting means that is movable toward the top spring mounting means to compress the spring of a spring assembly mounted between them. Hook means on the top and bottom spring mounting means engage coils of the spring in the spring assembly to enable the spring to be compressed in order to service the spring assembly. However, some spring assemblies, such as certain MacPherson strut assemblies for example, employ too short a spring for the spring to be sufficiently compressed, by engaging the coils of the spring, so as to allow removal of a shock absorber mounted within the spring. These spring assemblies, with short springs, also usually employ a top mounting plate which prevents the hooks from engaging the uppermost coil of the spring thereby further limiting the amount that the spring can be compressed. If the spring assembly also employs a bottom spring plate, the bottom coil cannot be engaged thus further limiting the amount that the spring can be compressed.

Some of the spring assemblies being compressed also have coatings on the springs, such as an epoxy coating, to protect the springs. The hooks on the known spring compressors can damage these coatings. The known spring compressors, which sit on the floor, are also difficult to move because of their size and weight.

SUMMARY OF THE INVENTION

It is the purpose of the present invention to provide a spring compressor that can easily and safely compress a spring assembly from an end which employs a plate on the spring assembly. It is another purpose of the present invention to provide a spring compressor that can be more protective when compressing spring assemblies that have coated springs. It is a further purpose of the present invention to provide a spring compressor designed to receive an accessory which permits the spring compressor to be easily moved when required. It is yet another purpose of the present invention to provide an accessory, which, when combined with the spring compressor, permits the compressor to be easily moved.

In accordance with the present invention there is provided a spring compressor of the type having top and bottom spring mounting means on a vertical post, with the top and bottom mounting means having coil spring assembly engaging means thereon. At least the top engaging means is designed to engage the top plate of a coil spring assembly. The top engaging means is particularly designed to engage both the top and sides of the top plate to securely hold the top end of the spring assembly in place during compression.

Also in accordance with the present invention there is provided a spring compressor having adapters that can be mounted on the spring mounting means for engaging the coils of a spring in a manner that minimizes damage to any coatings on the springs. The adapters are shaped to contact a relatively large portion of the circumference of a coil in the spring thereby reducing the loading on the coil and minimizing damage to any coating that the spring may have.

Further, in accordance with the present invention, the spring compressor is provided with a base which is adapted to cooperate with a two wheel dolly to allow easy movement of the spring compressor.

The invention is particularly directed toward a spring compressor having a base; a post; upper spring mounting means fixedly mounted on the upper portion of the post; and lower spring mounting means slidably mounted on the lower portion of the post. Moving means are mounted at one end on the post and at the other end on the lower spring mounting means to move the lower spring mounting means toward the upper spring mounting means to compress a spring in a spring assembly between them. The upper spring mounting means has spring engaging means for engaging the top of the spring assembly.

The invention is also particularly directed toward a spring compressor having a base; a post; upper spring mounting means fixedly mounted on the upper portion of the post and lower spring mounting means slidably mounted on the lower portion of the post. Moving means are mounted at one end on the post and at the other end on the lower spring mounting means to move the lower spring mounting means toward the upper spring mounting means to compress a spring in a spring assembly between them. Adapter means are mounted on at least one of the upper and lower spring mounting means to engage portions of a coil of the spring which portions have a substantial length. The adapter means has a coil engaging surface curved to the radius of the coil.

The invention is also directed toward a spring compressor having a base; a vertical post; and upper and lower spring mounting means on the post to compress a spring assembly between them. The base is in the form of tubular legs that radiate from the bottom of the vertical post and extend transversely thereto. The free end of at least one of the legs is open.

The invention is further directed toward a two-wheeled dolly for use with a spring compressor. The dolly has a cross-bar with a wheel mounted at each end of the cross-bar. A connector bar extends transversely from the cross-bar for insertion into one of the legs of the base through its open end. When the dolly is mounted on the base of the compressor, the compressor is tiltable about the axis of the wheels of the dolly so it can be easily maneuvered.

Figure 1:
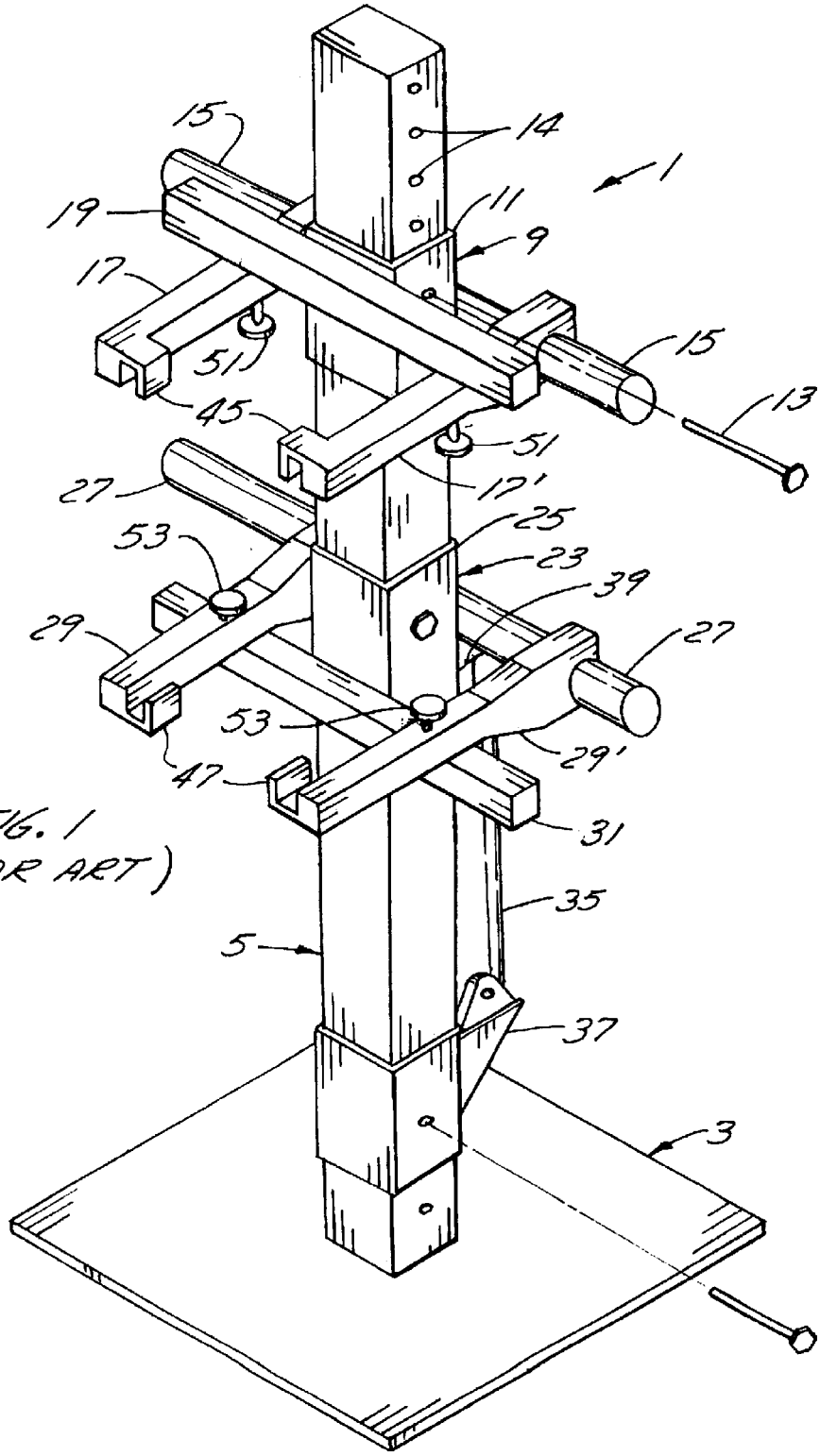
FIG. 1 (PRIOR ART)
FIG. 1 is a perspective view of a known spring compressor.

The prior art spring compressor 1, as shown in FIG. 1, comprises a base 3 supporting a vertical post 5. The spring compressor 1 has top spring mounting means 9 [fastened to] *which includes* a top sleeve 11 that is mounted on the top portion of the post 5. The top sleeve 11 preferably is adjustably mounted on the post by a pin 13 that passes through one of a number of vertically spaced-apart holes 14 in the post 5. The pin 13 fixes the top sleeve 11 in place on the post. A cylindrical, top support bar 15 is fixed to the back of the top sleeve 11. A pair of top spring support arms 17, 17' are slidably and rotatably mounted on the top support bar 15, one on each side of the post 5. A top stop bar 19 is mounted on the sleeve 11 above the top support bar 15 on the front of the sleeve and limits the upward movement of the spring support arms 17, 17'. The support bar 15 and stop bar 19 are parallel and horizontal.

The spring compressor 1 also has bottom spring mounting means 23 which are similar to the top spring mounting means 9. The bottom spring mounting means 23 has a sleeve 25 slidably mounted on the post 5 with a cylindrical, bottom support bar 27 attached to the back of the sleeve. A pair of bottom spring support arms 29, 29' are slidably and rotatably mounted on the bottom support bar 27, one on each side of the post 5. A bottom stop bar 31 is mounted on the front of the sleeve 25 below the support bar 27. The stop bar 31 limits the downward movement of the bottom support arms 29, 29'.

A hydraulic jack 35, such as a bottle jack, is mounted at one end on a bracket 37 on the bottom portion of the post 5, and at its other end to a bracket 39 on the back of the bottom sleeve 25. Operation of the jack 35 will move the bottom sleeve 25 toward the fixed top sleeve 11 to compress a spring assembly held between the support arms 17, 17' and 29, 29'.

The top support arms 17, 17, have spring engaging means 45 at their front end for engaging an upper coil of a spring in a spring assembly. The top spring engaging means are usually in the form of hooks as shown in U.S. Pat. No. 5,507,470. The bottom support arms 29, 29' also have spring engaging means 47 at their front end for engaging a lower coil of the spring. Again, these bottom spring engaging means are usually in the form of hooks.

To use the spring compressor, the bottom spring support arms 29, 29' are placed on the bottom stop bar 31 and slid along the bottom support bar 27 to space them apart the required distance to receive the spring assembly to be worked on between them. A lower spring coil, in the spring assembly, is then supported on the spring engaging means 47 on the front of the bottom arms 29, 29'. The top support arms 17, 17' are next rotated, and slid along the top support bar 15 to place their spring engaging means 45 on an upper coil of the spring assembly. Adjusting screws 51, 53 on the top and bottom support arms 17, 17' and 29, 29' are operated to abut the stop bars 19, 31 with the support arms 17, 17' and 29, 29' in a generally horizontal position while engaging the spring assembly. Once the spring assembly is engaged, the hydraulic jack 35 is operated to move the bottom sleeve 25 toward the top sleeve 11 to compress the spring in the spring assembly held between the support arms 17, 17' and 29, 29'.

The spring compressor, and its operation, described above, is generally the same as that shown in U.S. Pat. No. 5,507,470 and reference should be made to that patent for a more detailed description of the working of the compressor.

Figure 2:
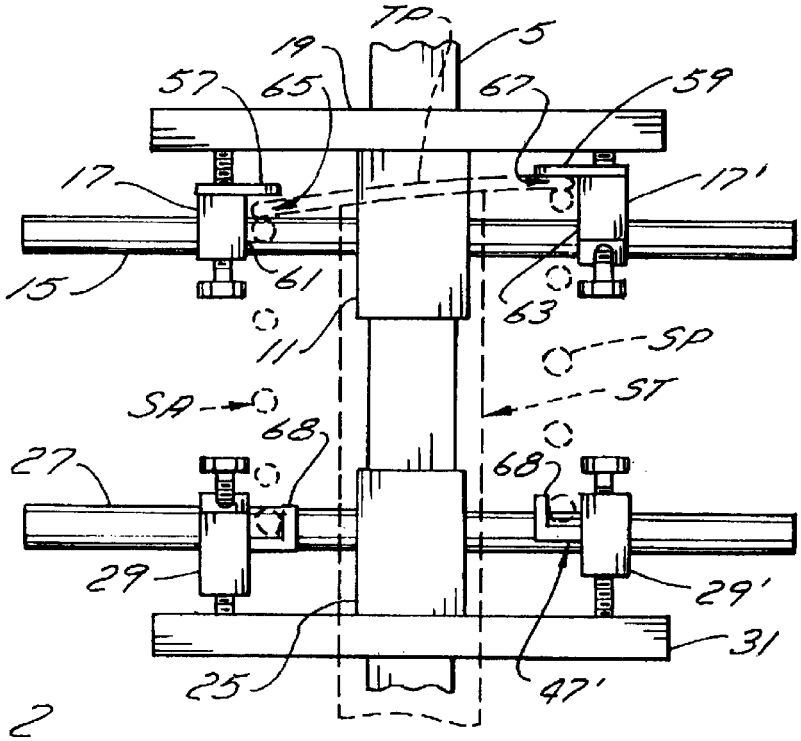
FIG. 2 is a detail front view of the compressor of the present invention.
Figure 3:
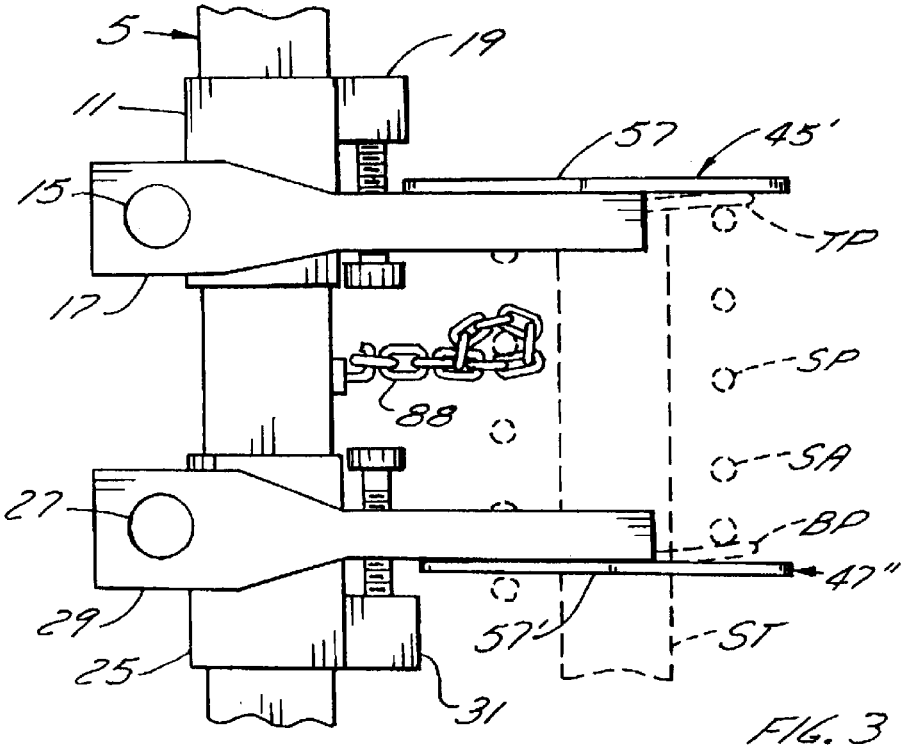
FIG. 3 is a detail side view of the compressor shown in FIG. 2.

In accordance with the present invention, and as shown in FIGS. 2 and 3, the spring compressor is provided, at least on the top support arms 17, 17', with top spring assembly engaging means 45' adapted to engage the top mounting plate of a spring assembly instead of one of the upper coils of the spring in the assembly. Preferably the top spring assembly engaging means 45' are in the form of abutments for engaging opposite sides of the top plate of the spring assembly. The abutments can be formed of elongated, flat plates 57, 59, one plate 57 fastened to the top of spring support arm 17 and the other plate 59 fastened to the top of spring support arm 17'. The plates 57, 59 project inwardly toward each other past the inner sides 61, 63 of the support arms 17, 17'. The inner sides 61, 63 of the support arms 17, 17' and the plates 57, 59 form corners 65, 67 to hold the top of the spring assembly SA in place. Hooks 68 can form the lower spring engaging means 47'. The spring assembly SA is of the MacPherson Strut type having a top mounting plate TP with a shock absorbing strut ST extending down from the plate TP within a coiled spring SP. The top plate TP fits within the corners 65, 67 formed by the plates 57, 59 and the inner sides 61, 63 of the support arms 17, 17' on both sides of the spring assembly SA. If the spring assembly SA is also of the type having a bottom spring plate BP, as shown in FIG. 3, then the hooks 68 can be replaced with plates 57' similar to plates 57, 59, to form the lower spring assembly engaging means 47". The plates 57' would contact the bottom spring plate BP.

Figure 4:
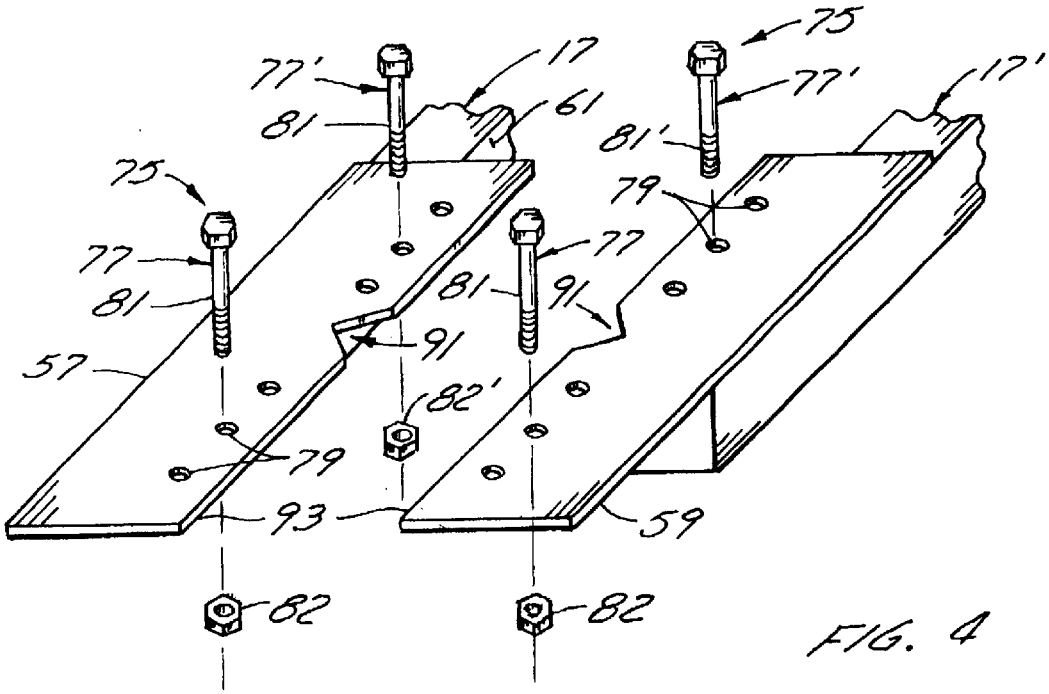
FIG. 4 is a perspective detail view of the spring assembly engaging means.
Figure 5:
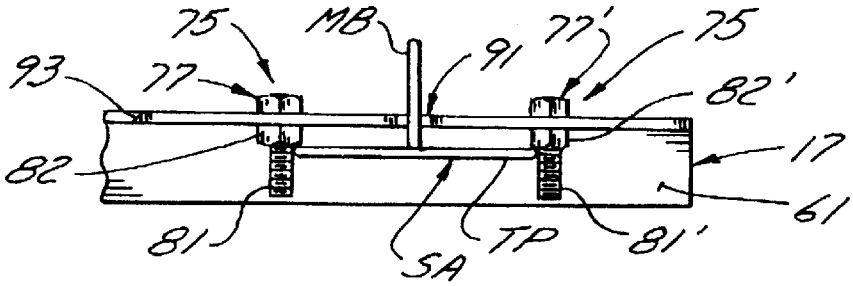
FIG. 5 is a detail side view of the spring assembly engaging means.

The abutments in the top spring assembly engaging means 45' are each preferably provided with retaining means 75, as shown in FIGS. 4 and 5 for retaining the spring assembly SA against movement toward or away from the post 5. The retaining means 75 can comprise a pair of bolts 77, 77' that are placed in appropriate holes in a set of spaced-apart holes 79 formed in the plates 57, 59 as shown in FIGS. 4 and 5. The shanks 81, 81' of the bolts 77, 77' are long enough to locate adjacent the side of the top plate TP of the spring assembly SA to prevent its movement toward or away from the post. Nuts 82, 82' retain the bolts 77, 77' in place. Similar retaining means can be provided with the plates 57' in the bottom spring assembly engaging means 47".

Figure 6:
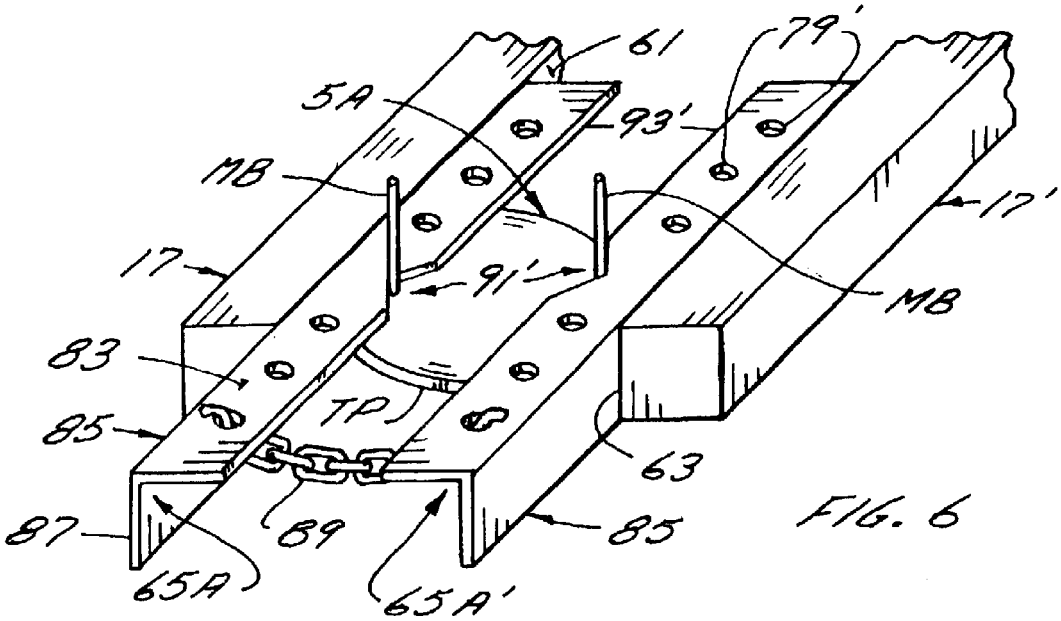
FIG. 6 is a perspective view of another embodiment of the spring assembly engaging means.

Preferably the top abutments are each formed by one flange 83 of an angle iron section 85 as shown in FIG. 6. The other flange 87 of the section 85 is fastened to the inner side 61, 63 of the arms 17, 17' as by welding, for example, and the flanges 83, 87 form the corners 65A, 65A' that receive the top plate TP of the spring assembly. The bottom abutments could similarly be formed by angle iron sections. The top and bottom angle iron sections have holes 79' in their horizontal flanges, similar to the holes 79 in the plates, for receiving the retaining means.

As a safety measure, a safety chain 88 can be provided on the front of the post 5 between the top and bottom spring mounting means for looping around a coil of the spring as shown in FIG. 3. As a further safety measure, a second safety chain 89, with hooks on its ends, could be provided on the front ends of the plates or angle sections, as shown in FIG. 6, both on the top and bottom spring mounting means. The chain 89 is hooked across the front ends to ensure that the spring assembly SA is retained between the support arms.

The top abutments, either the plates 57, 59 or flanges 83, are preferably notched, as shown at 91, 91' in FIGS. 4 and 6. The notches 91, 91' are generally centered on the sides 93, 93' of the plates or flanges and receive diametrically opposed mounting bolts MB extending up from the top plate TP of the spring assembly SA. The notches 91, 91' center the spring assembly relative to the top abutments.

Figure 7:
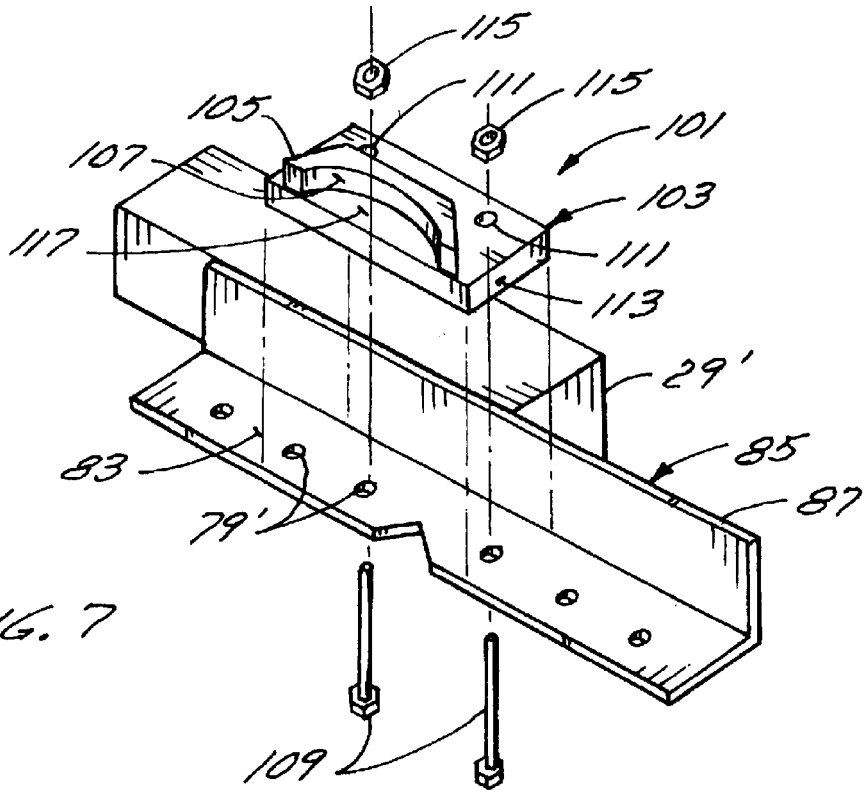
FIG. 7 is a detail, exploded, perspective view showing the adapter used with the spring compressor.
Figure 8:
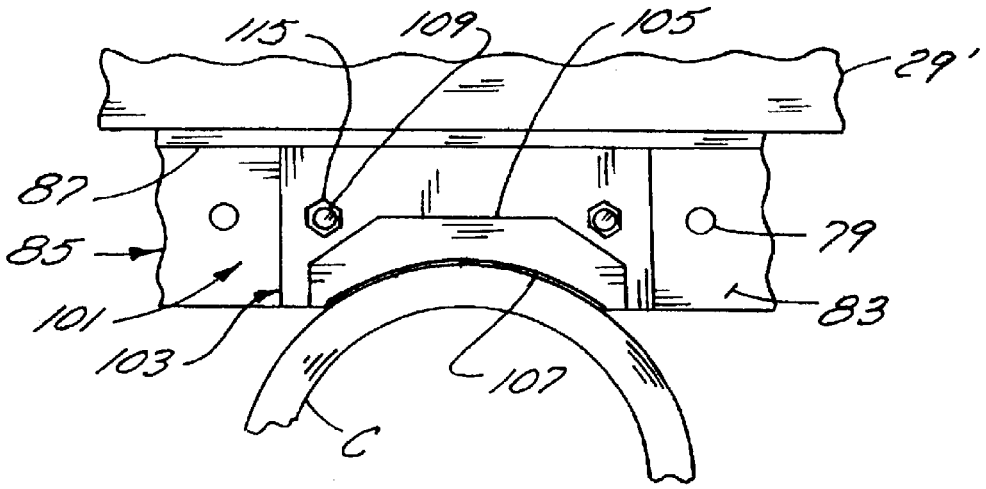
FIG. 8 is a top detail view showing the adapter engaging a spring.

A mounting adapter 101 can be provided for use with the abutments. The adapter 101 would be used with coil spring assemblies that are longer and that can be engaged by their coils instead of by their top and bottom plates. The mounting adapter 101 is constructed to provide lengthy contact with a coil in a coil spring. The mounting adapter 101 can comprise a small plate 103, as shown in FIGS. 7 and 8, and carries an elongated stop 105. The inner surface 107 of the stop 105 is concavely curved to match the diameter of the coils in the coil spring assembly to be worked on and the surface has a substantial length. The length of the inner surface 107 can equal up to thirty percent the circumference of the coils.

The adapters 101 are detachably connected to the surfaces of the plates 57, 59 or flanges 85 by bolts 109 passing through holes 111 adjacent the ends of the plate 103 and the holes 79, 79' in the plates 57, 59 or flanges 69. Nuts 115 on the bolts 109 retain the adapters in place. A coil is contacted by the large inner surface 107 of the elongated stop 105 on the plate 103 and by the surface 117 of the plate carrying the stop 105. The surfaces 107, 117 form a curved corner 119 to hold the coil in place, which in turn holds the spring assembly in place. The large amount of contact the surfaces 107, 117 make with the coil spreads the force applied to the coil and thus minimizes any damage to any coating on the coil. If the spring compressor is to be used mainly on the type of spring assemblies that employ coated springs, then the adapters could be permanently fixed to the plates or angles, such as by welding.

The adapters 101 have been shown and described as being mounted on the abutments. However, they could also be mounted directly on the support arms 17, 17' and 29, 29' of the prior art compressor shown in FIG. 1 in place of the hooks 45, 47. The plates 103 would be made slightly wider and the plates could then be welded directly onto the support arms 17, 17' and 29, 29', with the plates extending inwardly past the inner sides of the arms. The stops on the adapters on the top support arms would face the stops on the adapters on the bottom support arms.

The spring compressor shown in FIG. 1 could be provided with various support arms, and accessories for the support arms, when it is sold so that it could handle various types of springs and spring assemblies. Support arms could be provided which carry hooks or abutments or adapters. The adapters could also be provided as detachable accessories for the abutments carried on the arms.

Figure 9:
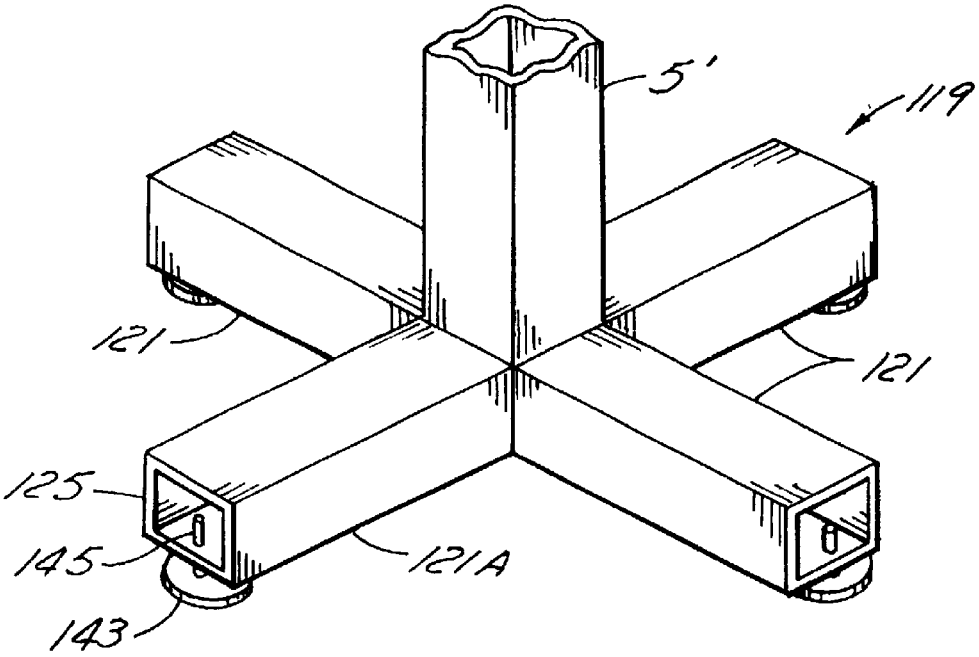
FIG. 9 is a perspective view of the base of the spring compressor.

The spring compressor is fairly heavy and thus is usually placed in the most convenient place in a shop and left there. However, in some shops, the compressor is often moved for one reason or another. To facilitate easy moving of the compressor, so that one person could easily move it, the base of the compressor is constructed to receive a two wheel dolly. As shown in FIG. 9 the base 119 of the spring compressor comprises tubular legs 121 extending radially from the bottom of the vertical post 5'. The legs 121 extend transverse to the post and preferably have a square cross-section. Preferably there are four legs 121 arranged in a cross-shape. The free end 125 of at least one of the legs 121A is open to receive the dolly. Preferably this one leg 121A is in front of the compressor.

Figure 10:
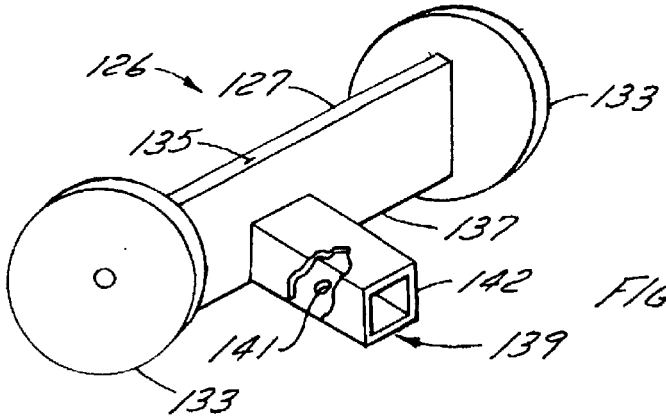
FIG. 10 is a perspective view of the dolly.
Figure 11:
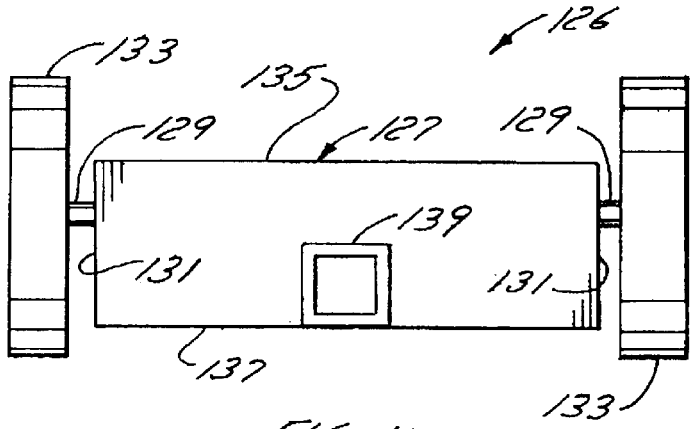
FIG. 11 is a front view of the dolly.

As shown in FIGS. 10 and 11 the dolly 126 used to move the spring compressor has a cross bar 127 of rectangular cross-section. An axle 129 extends from each end 131 of the cross bar 127 and a wheel 133 is mounted on the free end of the axle 129. The axles 129 are located closer to the top 135 of the cross bar 127 than to the bottom 137. A connector bar 139 extends transversely from the cross bar 127. The connector bar 139 is relatively short, located closer to the bottom 137 than to the top 135 of the cross bar 127 and is midway between the ends 131 of the cross bar 127.

Figure 12:
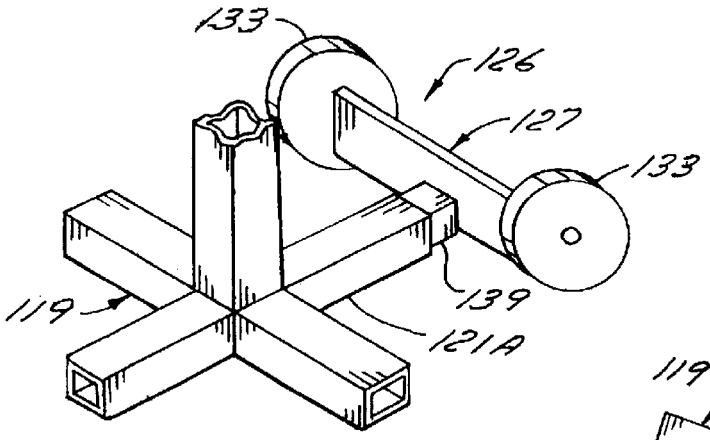
FIG. 12 is a detail view showing the dolly mounted on the base of the compressor.
Figure 13:
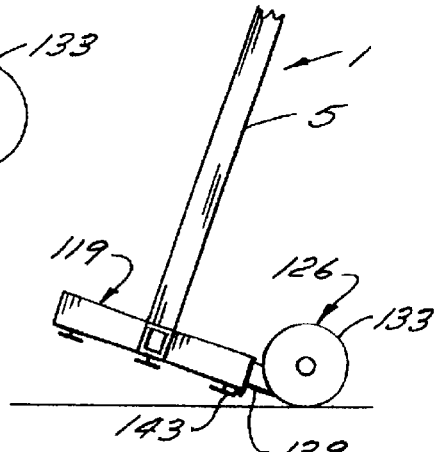
FIG. 13 is a side view showing the dolly in use to move the compressor.

The connector bar 139 is sized to fit snugly within one of the legs 121A of the base 119 of the spring compressor, the leg having an open free end as shown in FIG. 12. When mounted within one of the legs, the compressor can be tilted from the vertical as shown in FIG. 13 so that it is completely supported by the dolly 125. In this position it can be easily repositioned. Preferably retaining means are provided for retaining the connector bar 139 within the leg 121A of the base 119. The retaining means can comprise a threaded hole 141 in the bottom of the connector bar 139 near its free end 142. An adjusting screw 143 is threaded through an opening 145 in the bottom, front end of the leg 121A. The screw 143 is moved out of the interior of the tubular leg 121A so that the connector bar 139 can enter the leg 121A. The screw 143 is then threaded back into the leg passing through the threaded hole 141 in the connector bar 139 to retain the bar in place. While one form of retaining means employing the adjustment screws on the bottom of the legs of the base have been described, other forms of retaining means could be used.

I claim:

[1. A spring compressor having: a base; a post; upper spring mounting means fixedly mounted on the upper portion of the post; lower spring mounting means slidably mounted on the lower portion of the post; moving means mounted at one end on the post and at the other end on the lower spring mounting means to move the lower spring mounting means toward the upper spring mounting means to compress a spring in a spring assembly mounted between them; at least the upper spring mounting means having opposed, elongated, spring engaging means for engaging only the top and opposed sides of the spring assembly.]

[2. A spring compressor as claimed in claim 1 wherein each spring mounting means has a pair of mounting arms; each upper mounting arm carrying a narrow plate that projects past the inner side of the arm, which side faces the other arm; the plate and inner side of the arm forming a corner that receives the top, side of the spring assembly.]

[3. A spring compressor as claimed in claim 2 wherein the plate is formed by one flange of an angle iron member, the other flange of the member attached to the inner side of the arm which side faces the other arm, the flanges forming a corner for receiving the top side of the spring assembly.]

4. A spring compressor as claimed in claim [2] *29* including retaining means on each plate for use in positioning the spring assembly and for preventing movement of the top of the spring assembly toward or away from the post.

5. A spring compressor as claimed in claim [2] *29* including a notch in the inner side of each plate for helping to locate the spring assembly relative to the post through two diametrically opposed bolts extending up from the cover of the spring assembly.

6. A spring compressor as claimed in claim [1] *28* including adapter means detachably mounted on the spring engaging means for allowing the spring compressor to engage the sides of a coil of the spring, the adapter means having a coil engaging surface curved to the approximate radius of the coil.

7. A spring compressor as claimed in claim [3] *30* including a notch in the inner side of each one flange forming the plate for helping to locate the spring assembly relative to the post through two diametrically opposed bolts extending up from the cover of the spring assembly.

8. A spring compressor having: a base; a post; upper spring mounting means fixedly mounted on the upper portion of the post; lower spring mounting means slidably mounted on the lower portion of the post; moving means mounted at one end on the post and at the other end on the lower spring mounting means to move the lower spring mounting means toward the upper spring mounting means to compress a spring in a spring assembly mounted between them; each spring mounting means having a pair of mounting arms; an angle iron member on each mounting arm, with one flange attached to the inner side of the mounting arm facing the other arm, the other flange extending inwardly toward the other arm, each member forming a corner for receiving a top side of the spring assembly; and retaining means on each other flange for preventing movement of the top of the spring assembly toward or away from the post.

9. A spring assembly as claimed in claim 8 wherein the retaining means are adjustable relative to one another and to the post.

10. A spring compressor as claimed in claim 8 wherein the [stop] *retaining* means comprise a pair of bolts and a plurality of spaced apart holes are provided in the one flange, the bolts insertable through selected holes to retain the spring assembly against movement toward or away from the post.

11. A spring compressor having: a base; a post; upper spring mounting means fixedly mounted on the upper portion of the post; lower spring mounting means slidably mounted on the lower portion of the post; moving means mounted at one end on the post and at the other end on the lower spring mounting means to move the lower spring mounting means toward the upper spring mounting means to compress a spring in a spring assembly mounted between them; each spring mounting means having a pair of mounting arms; each upper mounting arm carrying a narrow plate that projects past the inner side of the arm, which side faces the other arm; the plate and inner side of the arm forming a corner that receives the top, side of the spring assembly; retaining means on each plate for use in positioning the spring assembly and for preventing movement of the top of the spring assembly toward or away from the post, the retaining means comprising a pair of bolts and a plurality of spaced apart holes in the portion of the plate that projects past the inside of the arm, the bolts insertable through selected holes to retain the spring assembly against movement toward or away from the post.

12. A spring compressor as claimed in claim 6 wherein the coil engaging surface engages between ten and thirty percent of the circumference of the coil.

[13. A spring compressor as claimed in claim 12 wherein at least one of the spring mounting means has spring engaging means, the adapter means mounted on the spring engaging means in a position to contact the side of a coil in a coil spring engaged by the engaging means.]

14. A spring compressor *as* claimed in claim [13] *6* wherein the coil spring engaging means comprise an abutment plate, the adapter mounted on the abutment plate.

15. A spring compressor *as* claimed in claim [13] *6* wherein the coil spring engaging means comprise a flange of an angle iron member, the adapter mounted on the flange.

*16. Spring mounting means for use in mounting the top plate of a spring assembly on a spring compressor, which compressor has a vertical post; the mounting means having; a sleeve for use in mounting the mounting means on the post; a cylindrical support bar on the sleeve extending transverse to the axis of the sleeve; a pair of spring assembly support arms slidably and rotatably mounted on the support bar, one support arm on each side of the sleeve; adjustable stop means on the mounting means for limiting rotation of the support arms to have them about horizontal when mounting the spring assembly on the compressor; and elongated, spring assembly engaging means on each support arm facing the other support arm, the spring assembly engaging means engaging the top plate only of the spring assembly and having an elongated abutment engaging a side of the top of the top plate when mounting the spring assembly on the compressor, the abutments forming part of opposed, elongated, corners which corners hold the top plate of the spring assembly, by its top and opposed sides, in place between the corners.*

*17. Spring mounting means as claimed in claim 16 including spring adapter means detachably mounted on the spring assembly engaging means for allowing the spring mounting means to engage the sides of a coil of the spring in the spring assembly, the adapter means having a coil engaging surface curved to the approximate radius of the coil.*

*18. Spring mounting means as claimed in claim 16 wherein the engaging means comprises a narrow plate that projects past the inner side of each arm toward the other arm, the plate and inner side of the arm forming a corner that receives the top and side of the spring assembly.*

*19. Spring mounting means as claimed in claim 16, wherein the abutment of the top spring engaging means comprises a flange of an angle iron section, the flange of each section extending toward the other mounting arm in position to engage the top plate, the other flange of each section attached to the inner side of a mounting arm in position to engage the side of the top plate, the sections forming the corners that hold the top plate by its top and sides.*

*20. Spring mounting means as claimed in claim 19 including a notch in the inner side of each other flange for helping to locate the spring assembly relative to the post through two diametrically opposed bolts extending from the top of the spring assembly.*

*21. Spring mounting means as claimed in claim 19 including spring adapter means detachably mounted on the other flange of the spring assembly engaging means for allowing the spring compressor to engage the sides of a coil of the spring in the spring assembly, the adapter means having a coil engaging surface curved to the approximate radius of the coil.*

*22. Spring mounting means as claimed in claim 19 including retaining means on each other flange for preventing movement of the top of the spring assembly toward or away from the post.*

*23. Spring mounting means as claimed in claim 22 wherein the retaining means comprises a pair of bolts and a plurality of spaced apart holes in the other flange, the bolts insertable through selected holes to retain the spring assembly against movement toward or away from the post.*

*24. Spring mounting means as claimed in claim 18 including retaining means on each plate for use in positioning the spring assembly and for preventing movement of the top of the spring assembly toward and away from the post.*

*25. Spring mounting means as claimed in claim 24 wherein the retaining means comprises a pair of bolts and a plurality of spaced apart holes in the portion of the plate*

*that projects past the inside of the arm, the bolts insertable through selected holes to retain the spring assembly against movement toward or away from the post.*

*26. Spring mounting means as claimed in claim 18 including a notch in the inner side of each plate for helping to locate the spring assembly relative to the post through two diametrically opposed bolts extending up from the top of the spring assembly.*

*27. Spring mounting means as claimed in claim 18 including spring adapter means detachably mounted on the plate of the spring engaging means for allowing the spring compressor to engage the sides of a coil of the spring in the spring assembly, the adapter means having a coil engaging surface curved to the approximate radius of the coil.*

*28. A spring compressor having: a base; a post; upper spring mounting means fixedly mounted on the upper portion of the post; lower spring mounting means slidably mounted on the lower portion of the post; moving means mounted at one end on the post and at the other end on the lower spring mounting means to move the lower spring mounting means toward the upper spring mounting means to compress a spring in a spring assembly mounted between them, the spring assembly having a top plate; at least the upper spring mounting means having top spring engaging means to engage only the top plate of the spring assembly, the top spring engaging means comprising two opposed, elongated, abutments, the abutments engaging opposed sides of the top of the top plate; the abutments forming part of opposed, elongated, corners to hold the top plate of the spring assembly, by its top and sides, in place between the corners.*

*29. A spring compressor as claimed in claim 28 wherein each spring mounting means has a pair of mounting arms; the abutments of the top spring engaging means each comprising a flat plate, one plate mounted on the top of each arm and extending past the inner side of the arm, which side faces the other arm; the plates and the inner sides of the associated arms forming the corners that hold the top plate.*

*30. A spring compressor as claimed in claim 28 wherein each spring mounting means has a pair of mounting arms; the abutments of the top spring engaging means each comprising a flange of an angle iron section, the flange of each section extending toward the other mounting arm; the other flange of each section attached to the inner side of a mounting arm; the sections forming the corners that hold the top plate.*

* * * * *